United States Patent [19]

Maple

[11] Patent Number: 4,933,666
[45] Date of Patent: Jun. 12, 1990

[54] INITIAL BRAKE WARNING LIGHT ASSEMBLY

[76] Inventor: H. Glen Maple, 7172 Marshall Rd., Upper Darby, Pa. 19082

[21] Appl. No.: 385,318

[22] Filed: Jul. 27, 1989

[51] Int. Cl.$^5$ .............................................. B60Q 1/26
[52] U.S. Cl. ..................................... 340/464; 340/479
[58] Field of Search .................... 340/425.5, 461, 464, 340/467, 468, 469, 479

[56]     References Cited
U.S. PATENT DOCUMENTS 4,231,013  10/1980  Freeman et al. .................... 340/479

Primary Examiner—Joseph A. Orsino
Assistant Examiner—Frank M. Scutch, III
Attorney, Agent, or Firm—Phillip A. Rein

[57]     ABSTRACT

This invention relates to an initial brake warning light assembly which can be attached to existing or new car manufactured vehicles and to present a visual alarm signal on contact with a brake pad member on a brake actuator assembly to indicate that the vehicle operator has touched the brake pedal and, therefore, is anticipating a full braking operation. The initial brake warning light assembly includes (1) a brake light actuator assembly connected to a brake pad member on the brake actuator assembly (2) a visual warning assembly connected to the brake light actuator assembly to present an initial brake warning signal; and (3) an electrical control circuit interconnecting the visual warning assembly to the brake light actuator assembly. The brake light actuator assembly includes an actuator switch member connected to the brake pad member and which will be initially contacted and depressed by an operator's foot member to energize the visual warning assembly. The visual warning assembly includes an initial brake warning light connected to the actuator switch member so as to energize an amber warning light on closing of the actuator switch member and, further, having a brake warning light which is operable on depression of the brake pad member to indicate the normal red signal light indicating that the vehicle brakes are being applied.

6 Claims, 2 Drawing Sheets

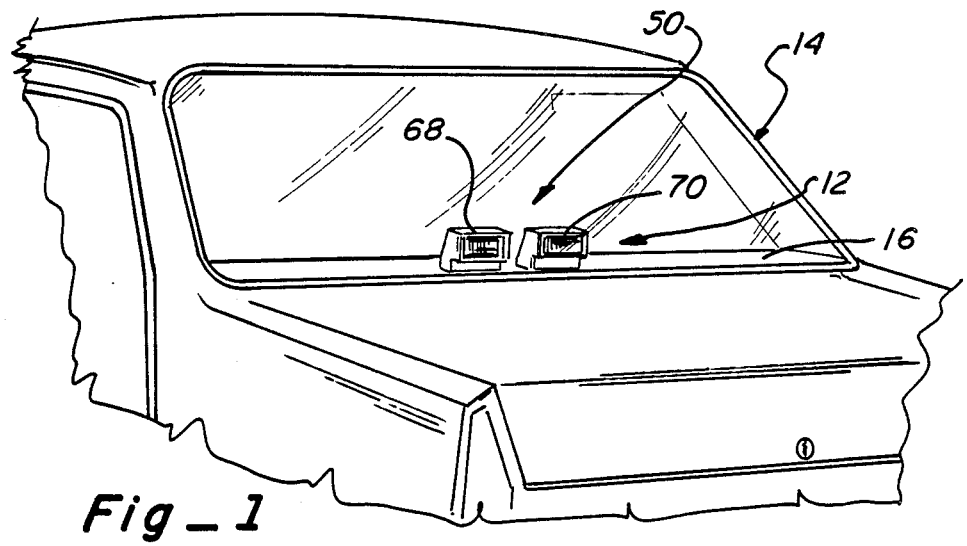
Fig_1
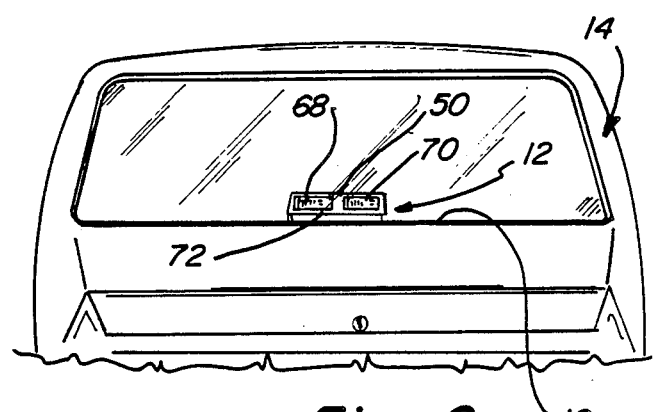
Fig_2
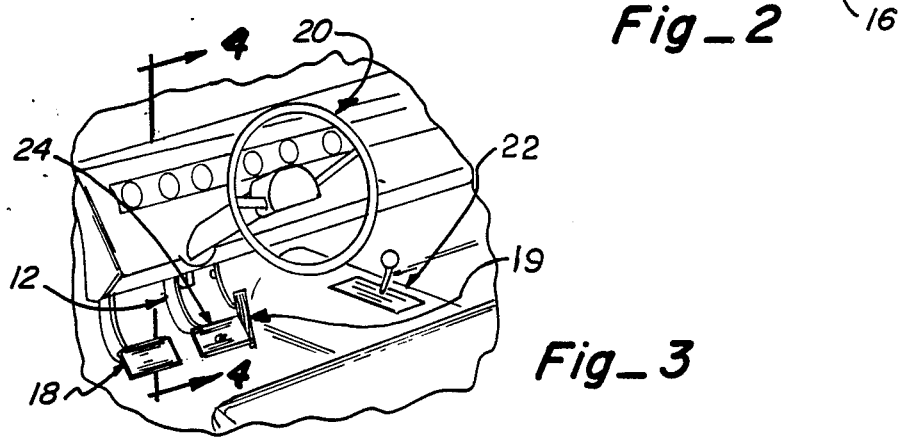
Fig_3

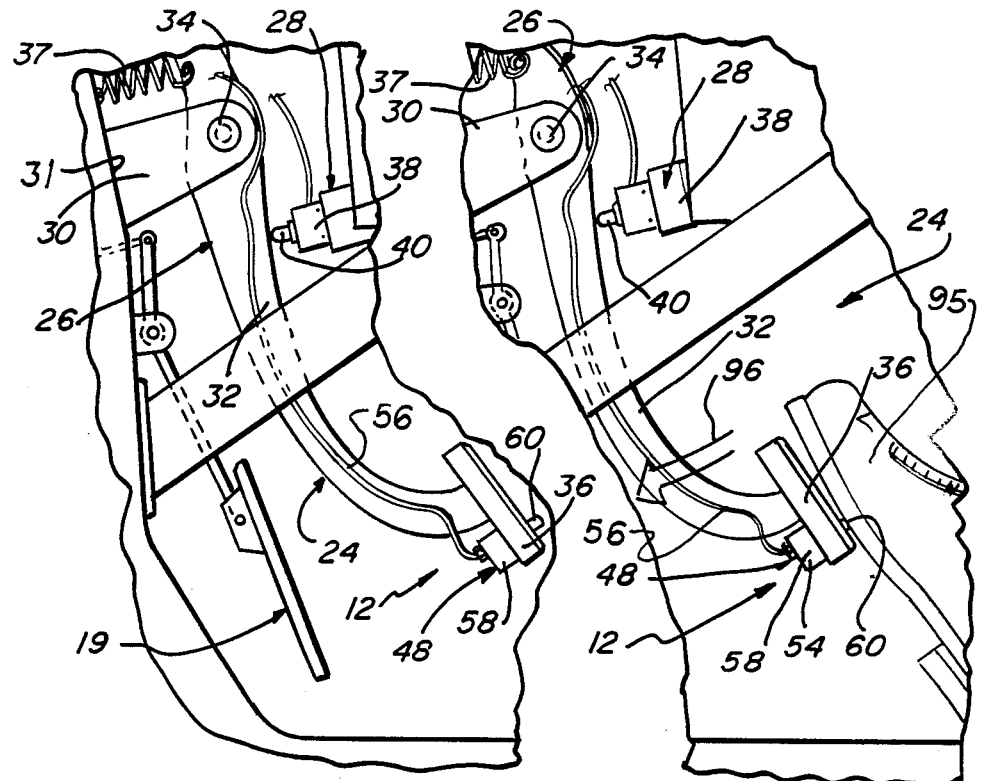
Fig_4   Fig_5
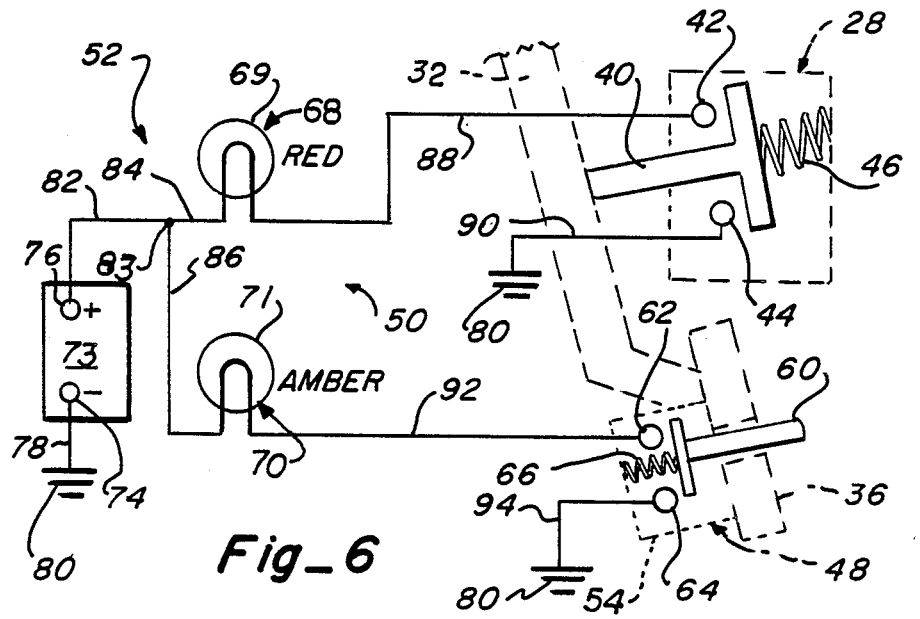
Fig_6

INITIAL BRAKE WARNING LIGHT ASSEMBLY

PRIOR ART

A patent search on this invention revealed the following United States Patents:

| U.S. Pat. No. | Invention | Inventor |
| --- | --- | --- |
| 3,492,638 | SIGNAL SYSTEM FOR AUTOMOTIVE VEHICLES | James N. Lane |
| 3,497,871 | ALERTING SIGNAL SYSTEM FOR INDICATING THE OPERATING CONDITION OF MOTOR VEHICLES | Armand S. Damico |
| 3,875,559 | CIRCUIT SYSTEM FOR BRAKE LIGHTS | Istvan Szekessy |
| 4,651,129 | MOTOR VEHICLE REAR LIGHT ASSEMBLY | Wood et al |
| 4,667,177 | BRAKE LIGHT SIGNAL FOR A MOTOR VEHICLE | Ravindra G. Athalye |
| 4,757,301 | LIGHT PREWARNING SYSTEM FOR DIESEL VEHICLES | Morris Neale, Jr. |
| 4,772,868 | SIGNAL WARNING SYSTEM FOR MOTOR VEHICLE | Chang-Shyang Chen |

The Lane patent discloses a signal system for automotive vehicles having a plurality of lights in the upper rear portion of the vehicle and depression of the brake pedal operates to indicate whether a normal braking situation is being incurred or an emergency type braking situation which would then illuminate all lights being for "sudden-stop-caution simultaneously".

The Damico patent discloses a signal system for indicating the operating condition of motor vehicles and, more particularly, utilizes red, amber, and green lights which are energized depending on the depression of a gas pedal.

The Wood et al patent discloses a motor vehicle rear light assembly which has flashing lights on the initial application of brakes.

The Athalye patent discloses a brake light system for a motor vehicle utilizing mercury switches and relays and with the lights placed in the rear window of the vehicle as noted in FIG. 1.

The Neale, Jr. and Chen patents disclose light warning systems for vehicles utilizing a signaling system to sense engine deceleration.

PREFERRED EMBODIMENT OF THE INVENTION

In one preferred embodiment of this invention, an initial brake warning light assembly is usable with a normal brake warning system on a motor vehicle and being operable through the use of a modified conventional brake pedal assembly. The brake pedal assembly is operable on depression of a brake pedal member to actuate a brake switch assembly so as to illuminate a brake light member which would be visible through (1) normal pairs of spaced brake lights on the rear of the motor vehicle; and (2) a brake light member mounted on a rear window dash in the motor vehicle as required in newer model vehicles. The initial brake warning light assembly includes (1) a brake light actuator assembly; (2) a visual assembly mounted in the rear window dash; and (3) an electrical control circuit mounted between the brake light actuator assembly and the visual warning assembly to provide an electrical actuator means therefore. The brake light actuator assembly includes an actuator switch mounted on a brake pedal member in the vehicle and supplied with operating current through an electrical supply cord which, in turn, is connected to the electrical control circuit. The visual warning assembly includes the normal brake warning lights and an initial brake warning light which will be energized by the electrical control circuit of this invention. The electrical control circuit is mounted between the visual warning assembly to provide a signal to the initial brake warning light which is preferably an amber light to indicate the initial braking thereof and would illuminate concurrently the normal red brake warning lights. The main function of this invention is to provide a visual alert signal which may be initiated when the operator of a motor vehicle initially contacts the brake pedal member and energizes the amber initial warning light even though the normal brake pedal has not been depressed. This is an initial warning signal to trailing vehicles that a braking situation is about to happen in order to give additional time for the following vehicle to react thereto.

OBJECTS OF THE INVENTION

One object of this invention is to provide an initial brake warning light assembly which can be installed on existing or new vehicles and provides an initial brake warning light which is illuminated on mere touching of a brake pedal member without actual depression thereof.

Another object of this invention is to provide an initial brake warning light assembly which can be easily installed on existing brake pedal members or can be provided as original equipment on new vehicles with an initial brake warning light mounted in rear window dash areas of motor vehicles.

One other object of this invention is to provide an initial brake warning light assembly providing an initial brake warning light illuminated on mere depression of an actuator switch member mounted on a brake pedal member of a motor vehicle.

One further object of this invention is to provide an initial brake warning light assembly that is easy to install on existing vehicles; economical to manufacture; provided as original equipment on new manufactured vehicles; simple to install; reliable in operation; and substantially maintenance free.

Various other objects, advantages, and features of the invention will become apparent to those skilled in the art from the following discussion, taken in conjunction with the accompanying drawings, in which:

FIGURES OF THE INVENTION

FIG. 1 is a fragmentary perspective view of a rear window area in a motor vehicle illustrating a separate pair of warning light therein utilized with an initial brake warning light assembly of this invention;

FIG. 2 is a fragmentary rear elevational view of a motor vehicle showing the warning lights as a single unit utilizing the initial brake warning light assembly of this invention;

FIG. 3 is a fragmentary perspective view of an interior portion of a motor vehicle illustrating a brake pedal having an actuator switch member of the initial brake warning light assembly of this invention connected thereto;

FIG. 4 is a fragmentary elevational view illustrating a brake pedal assembly found in conventional motor vehicles and having the initial brake warning light assembly of this invention attached thereto;

FIG. 5 is a view similar to FIG. 4 but illustrating a vehicle operator's foot member depressing the brake pedal assembly and an actuator switch member of the initial brake warning light assembly of this invention; and FIG. 6 is an electrical schematic diagram illustrating the use and operation of the initial brake warning light assembly of this invention.

The following is a discussion and description of preferred specific embodiments of the initial brake warning light assembly of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawings in detail, an initial brake warning light assembly of this invention, indicated generally at 12, is shown in FIG. 1 as attached to a motor vehicle 14 and having an initial warning light member mounted on a rear window dash 16 so as to be readily visible by trailing vehicles.

The motor vehicle 14 is of a conventional nature having (1) the rear window dash 16; (2) a clutch pedal assembly 18; (3) an accelerator pedal assembly 19; (4) a steering wheel assembly 20; (5) a gear shift assembly 22; and (6) a brake pedal assembly 24.

As noted in FIG. 4, the brake pedal assembly 24 includes (1) a brake actuator assembly 26; and (2) a brake switch assembly 28 mounted on the brake actuator assembly 26.

The brake actuator assembly 26 includes (1) a brake support lug 30 secured to a support wall member 31 in the motor vehicle 14; (2) a brake lever arm 32 pivotally connected to the brake support lug 30 through a brake pivot shaft 34; (3) a brake pad member 36 connected to an outer end of the brake lever arm 32; and (4) a spring member 37 attachable to one end of the brake lever arm 32 and the front wall member 31 of the motor vehicle 14 being operable to bias the brake lever arm 32 in the released or non-actuated condition as noted in FIG. 4.

The brake switch assembly 28 includes (1) a brake switch housing 38; (2) a brake plunger member 40 mounted within the brake switch housing 38; (3) a pair of brake contact points 42, 44 interconnected through the electrical control circuit 52 to illuminate conventional brake lights; and (4) a brake plunger bias member 46 to bias the brake plunger member 40 into contact with the brake contact points 42, 44 on pivotal movement of the brake lever arm 32 to the brake actuated condition as shown in FIG. 5.

The brake pedal assembly 24 is operable in a conventional manner whereupon the brake switch assembly 28 and, more particularly, the brake contact points 42, 44 are closed on pivotal movement of the brake lever arm 32 to move the brake plunger member 40 outwardly and cause a closing of brake contact points or terminals 42, 44 to illuminate a brake light on the motor vehicle 14 in a conventional manner.

The initial brake warning light assembly 12 includes (1) a brake light actuator assembly or actuator means 48 connected to the brake pad member 36; (2) a visual warning assembly 50 to provide a visual signal outwardly of a rear window and mounted on a rear window dash 16 as noted in FIGS. 1 and 2; and (3) an electrical control circuit or circuit means 52 to connect the visual warning assembly 50 to a power supply such as a battery within the vehicle 14 and attached to the brake pedal assembly 24 in a manner to be described.

The brake light actuator assembly 48 includes an actuator switch member 54 connected to a bottom surface of the brake pad member 36 and an electrical supply cord 56 connected to the actuator switch member 54 and to the electrical control circuit 52.

The actuator switch member 54 is of a normally open type and includes (1) a switch housing 58; (2) a plunger member 60 mounted within the switch housing 58 and extended outwardly of the brake pad member 36; (3) contact points or terminals 62, 64 which are engageable with the plunger member 60 to close a circuit therethrough; and (4) a bias member 66 operable to bias the plunger member 60 to the normally open condition (FIG. 6).

The electrical supply cord 56 is illustrated as mounted against the brake lever arm 32 and connects the electrical control circuit 52 to the actuator switch member 54.

The visual warning assembly 50 includes (1) a brake warning light 68 which is normally found on new cars to be energized on actuation of the brake actuator assembly 26 of the brake pedal assembly 24; (2) an initial brake warning light 70 which can be mounted separately on a rear window dash 16 of the motor vehicle 14 as noted in FIG. 1; and (3) a combination initial and brake warning assembly 72 which in combination have the brake warning light 68 and the initial brake warning lights 70 in one unit as noted in FIG. 2.

The brake warning light 68 has a brake bulb 69 which is normally illuminated in a bright red color to indicate that the brake pedal assembly 24 has been depressed to signal a braking function.

The initial brake warning light 70 has an initial brake bulb 71 of an amber color which would be an initial signal that the actual braking operation of the brake pedal assembly 24 may be about to happen.

The combination initial and brake warning assembly 72 is provided with a combination of the aforementioned brake warning light 68 of a red color and the initial brake warning light 70 of an amber illuminating color.

As noted in FIG. 6, the electrical control circuit 52 includes a power supply or battery member 73 normally being a 12 volt DC battery having terminals 74, 76 thereon. The terminal 74 is connected by a line 78 to ground 80.

The terminal 76 is connected by a line 82 to a common terminal point 83. The terminal point 83 is connected by a line 84 to the brake bulb 69 as found on all vehicles 14 to illuminate the brake warning light 68. The terminal 83 is also connected through a line 86 to the initial brake bulb 71.

The power to the brake bulb 69 is connected by a line 88 to the brake switch assembly 28. At this point, on movement of the brake plunger member 40 to a closed position, power from the contact point 42 is transferred to the contact point 44 and through a line 90 to ground 80. It is obvious that this grounding would then illuminate the brake bulb 69 in the brake warning light 68.

From the initial brake bulb 71, a line 92 connects same to the brake light actuator assembly 48 and, more specifically, to the contact terminal 62. Movement of the plunger member 60 operates to achieve electrical continuity between the contact terminal 62 to the contact terminal 64 and then through a line 94 to ground 80. It is seen that movement of the plunger member 60 against the bias member 66 operates to close the contact terminals 62, 64 achieving an illumination of the initial brake bulb 71 into an amber color signal.

USE AND OPERATION OF THE INVENTION

In the use and operation of the initial brake warning light assembly 12 of this invention, it is noted that it can be installed in new motor vehicles 14 and the electrical supply cord 56 can be molded within the brake lever arm 32 so that only a plunger member 60 would be extended from the brake pad member 36.

Additionally, in newer vehicles 14, the visual warning assembly 50 could be provided by the original car manufacturer in a compact single unit such as the combination initial and brake warning assembly 72 as noted in FIG. 2.

In existing motor vehicles 14, it is noted that the initial brake warning light assembly 12 can be mounted therein with a minimum amount of labor required. More specifically, the initial brake warning light assembly 12 is operable on having the actuator switch member 54 connected to an undersurface of the brake pad member 36. A hole would be drilled through the brake pad member 36 to receive the plunger member 60 therethrough (FIG. 4). Then, the electrical supply cord 56 can be mounted against the brake lever arm 32 and trained outwardly for attachment to the electrical control circuit 52.

As shown in FIG. 6, this is a simple installation procedure as the terminal 83 attached at the line 82 would have the line 86 connected to the initial brake warning light 70 to illuminate the initial brake bulb 71. The line 92 is connected to the actuator switch member 54. Then, the electrical supply cord 56 would contain the line 92 and the line 94 which is attached to any ground 80 found in the motor vehicle 14. The line 94 could be secured to the brake lever arm 32 which would then be ground 80.

As noted in FIGS. 4 and 5, the operation of the initial brake warning light assembly 12 is through the use of an operator's foot member 95 operable to initially contact an outer surface of the brake pad member 36 and conjointly contact and depress the plunger member 60. In the initial condition, we will assume that the brake lever arm 32 is not pivoted about the brake pivot shaft 34 so that the circuit through the brake warning light 68 is not complete so that the brake bulb 69 is not illuminated. However, due to the depression of the plunger member 60, the circuit is completed from the battery 73 through lines 82, 86, 92, and 94 to ground 80 so that the initial brake warning light 70 and the initial brake bulb 71 are illuminated to emit a visual alarm signal through the initial brake warning lights 70 or a combination thereof being the combination initial and brake warning assembly 72.

The use of the initial brake warning light assembly 12 gives an initial amber warning signal to a trailing motor vehicle so that the operator of the trailing motor vehicle will know that a braking operation may be forthcoming. Of course, many vehicle operators will place their foot on the brake pedal in anticipation of a braking action and, in light of this invention, will also inform the operator of a trailing motor vehicle of an anticipated braking function.

On actual depression of the brake pad member 36 as noted in FIG. 5 by an arrow 96, it is noted that the brake plunger member 40 moves to the closed condition by movement of the plunger bias member 46 to close contacts 42, 44. Therefore, the power from the battery 73 through lines 82, 84, 88, 90 to ground 80 is complete in order to actuate the brake warning light 68 and, more specifically, the brake bulb 69 to give the red light visual signal. Therefore, in this condition, it is seen that both the amber and red visual signals are visible through the rear window of the motor vehicle 14 to a trailing motor vehicle.

The initial brake warning light assembly 12 of this invention can be readily mounted on existing motor vehicles 14 without the requirement of high skilled labor. The initial brake warning light assembly 12 can be attached to the rear window dash 16 of new or older vehicles and can be supplied in a separate unit adjacent to an existing red brake warning light or, on manufacturing new vehicles, can be combined into a single light unit having separate warning lights for the initial brake warning light and the conventional brake warning light.

The initial brake warning light assembly of this invention is easy to install on existing vehicles; relatively inexpensive to manufacture; sturdy in construction; and substantially maintenance free.

While the invention has been described in conjunction with preferred specific embodiments thereof, it will be understood this description is intended to illustrate and not to limit the scope of the invention, which is defined by the following claims:

I claim:

1. An initial brake warning assembly connected to an initial brake warning signal system in a vehicle, comprising:
    (a) a brake light actuator assembly connected to a foot operated brake pad member on a vehicle having an actuator means extended transversely of an outer surface of said brake foot pad member;
    (b) a visual warning assembly connected to said brake light actuator assembly and mounted on the vehicle to emit a visual warning signal on actuation of said actuator means; and
    (c) electrical circuit means electrically connecting said actuator means to said visual warning light assembly and operable on actuation of said actuator means to energize said visual warning signal.

2. An initial brake warning light assembly as described in claim 1, wherein:
    (a) said actuator means includes an actuator switch member with a plunger member movable on contact to a closed circuit condition; and
    (b) said plunger member closed on initial contact to said closed circuit condition prior to movement of said brake foot pad member to energize said visual warning assembly only.

3. An initial brake warning light assembly as described in claim 1, wherein:
    (a) said visual warning assembly having an initial brake warning light operable to emit an amber colored visual signal on operation of said actuator means.

4. An initial brake warning light assembly as described in claim 3, wherein:
    (a) said visual warning assembly includes a brake warning light operable to emit a red colored visual signal on depression of said brake foot pad member.

5. An initial brake warning light assembly as described in claim 1, wherein:
 (a) said visual warning assembly having an initial brake warning light operable to emit a colored visual signal on operation of said actuator means;
 (b) said visual warning assembly includes a brake warning light operable to emit a red colored visual signal on movement of said brake foot pad member; and
 (c) said initial brake warning light and said brake warning light mounted together to form a combination initial and brake warning light assembly which may be mounted on a rear dash portion of the vehicle.

6. An initial brake warning light assembly as described in claim 1, wherein:
 (a) said electrical circuit means operable on contact of said actuator means to close a circuit therein and energize said visual warning assembly to produce a visual signal indicating contact of the brake pad member; and
 (b) said a second circuit member operable on actual movement of said brake pad member to close a contact in said visual warning assembly to energize a brake warning light to emit a visual signal.

* * * * *